W. M. STILL & A. G. ADAMSON.
STEAM TRAP.
APPLICATION FILED JUNE 10, 1908.
968,812.
Patented Aug. 30, 1910.
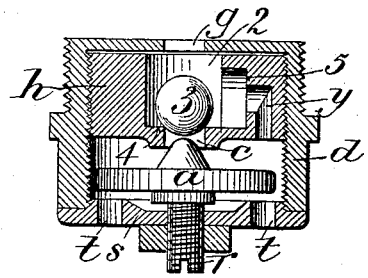
Witnesses.
J. P. Britt
E. C. Duffy
Inventors.
William Mudd Still
Andrew George Adamson,
by
Attys

UNITED STATES PATENT OFFICE.

WILLIAM MUDD STILL AND ANDREW GEORGE ADAMSON, OF LONDON, ENGLAND.

STEAM-TRAP.

968,812.  Specification of Letters Patent.  Patented Aug. 30, 1910.

Application filed June 10, 1908. Serial No. 437,747.

To all whom it may concern:

Be it known that we, WILLIAM MUDD STILL and ANDREW GEORGE ADAMSON, subjects of the King of Great Britain and Ireland, residing, respectively, at Hatton Garden, London, England, have invented Improvements in Steam-Traps, of which the following is a specification.

In steam pipes and the like provided with steam traps which are set to provide a sufficient release of water at ordinary working pressures, it sometimes happens, when steam is cut off from the system, that a considerable quantity of water accumulates and is only very slowly discharged through the steam traps, with the result that in cold weather freezing occurs. In the case of the steam heating apparatus of railway trains with thermostatic steam traps fitted on the steam couplings, it is found that owing to the water in the rubber tubes retaining its heat, the steam traps open too slowly to release of water sufficiently quickly to enable a workman to promptly uncouple the tubes without danger of scalding.

According to this invention there is combined with a steam trap a ball valve adapted to close a large water relief passage when the steam pressure is on, the steam trap proper then controlling the discharge of water, and when the steam pressure is cut off to open said water relief passage, and, it may be, close the passage which is normally under the control of the steam trap proper.

A suitable thermostatic device comprises a closed vessel containing an expansible liquid and carried by an adjustable screw, the top of the vessel being formed with a hollow conical projection adapted to enter and control a discharge orifice.

The accompanying drawing illustrates in central vertical section one arrangement of steam trap embodying this invention.

In the lower part of the chamber 2 containing the ball 3 there is an outlet passage $c$ the outer end of which is adapted to be closed by a thermostatic device $a$ of the kind referred to and there is also a laterally arranged outlet $y$ of sufficiently large area for the rapid discharge of water; the arrangement is such that when the pipe or the like which is to be relieved of water is under pressure the ball 3 is held seated in the lateral outlet $y$ by the internal pressure, but when the pressure is cut off the ball 3 falls, leaves the large outlet $y$ open and closes the lower outlet $c$. If the device $a$ is already contracted or as soon as it has become so the under side of the ball 3 is relieved of pressure so that the pressure of water above holds it securely to its seat 4, thus obviating a disadvantage that obtains in the use of ordinary gravity or ball valves where the loose ball is liable to be driven to its seating by the rush of the water and the relief outlet closed, or rendered irregular in action. On steam being again turned on, the thermostatic device $a$ is expanded by the contact of the steam escaping through the lateral outlet $y$ and caused to close the outer end of the lower outlet passage $c$, the pressure of the hollow conical projection of the device $a$ beneath the ball thereupon releasing it from its lower seat 4, when the flow of steam through the lateral outlet $y$ drives the ball to its seat 5 therein where it is held as long as the steam pressure is on, so that discharge of water will then be controlled by the thermostatic device.

As shown in the drawing the device $a$ must move the ball away from its seat 4 before the device can close the outer end of the passage $c$.

The ball chamber 2 and the lateral water discharge passage $y$ may conveniently be formed in a block $h$ screwed in the upper part of the casing $d$ of the trap, the passage $y$ being angled as shown, so that it discharges through the chamber containing the thermostatic device $a$.

What we claim is:—

1. In a steam trap, a chamber adapted to be placed in communication with a steam pipe or the like, an outlet passage from said chamber, a thermostatic device controlling the outer end of said outlet passage, a separate water relief passage branching from said chamber, and a ball valve located in said chamber and adapted to close the inner end of said water relief passage or the inner end of said outlet passage according to the pressure in said chamber, as set forth.

2. In a steam trap, a water relief passage, a ball valve controlling said passage, an outlet passage, and a thermostatic device comprising a closed vessel containing an expansible liquid and having a hollow conical projection that enters and controls said outlet passage.

3. In a steam trap, a casing, a block screwed in said casing, a chamber in said block, a water relief passage branching from said chamber, an outlet passage from said chamber, a ball valve located in said chamber adapted to close said water relief passage or said outlet passage according to the pressure in said chamber, and a thermostatic device controlling said outlet passage.

4. In a steam trap, a casing of cup like form formed with a hole at its inner end, a block screwed in said casing, a chamber in said block in line with the hole in the inner end of said casing, a water relief passage branching from said chamber, an outlet passage from said chamber, a ball valve located in said chamber adapted to close said water relief passage or said outlet passage according to the pressure in said chamber, a thermostatic device comprising a closed vessel containing an expansible liquid and having a hollow conical projection that enters and controls said outlet passage a perforated cover for the outer end of said casing, and an adjustable screw passing through said cover and carrying said thermostatic device.

Signed at London England this 28" day of May 1908.

WILLIAM MUDD STILL.
ANDREW GEORGE ADAMSON.

Witnesses:
  H. D. JAMESON,
  F. L. RAND.